(12) United States Patent
Garg et al.

(10) Patent No.: US 7,433,820 B2
(45) Date of Patent: Oct. 7, 2008

(54) ASYNCHRONOUS HIDDEN MARKOV MODEL METHOD AND SYSTEM

(75) Inventors: Ashutosh Garg, San Jose, CA (US);
Sreeram V. Balakrishnan, Los Altos, CA (US); Shivakumar Vaithyanathan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 10/844,093

(22) Filed: May 12, 2004

(65) Prior Publication Data

US 2005/0256713 A1 Nov. 17, 2005

(51) Int. Cl.
*G10L 15/14* (2006.01)
(52) U.S. Cl. .................................. 704/256.8
(58) Field of Classification Search .............. None
See application file for complete search history.

(56) References Cited

U.S. PATENT DOCUMENTS

| | | | |
|---|---|---|---|
| 4,852,180 | A | 7/1989 | Levinson |
| 5,862,259 | A | 1/1999 | Bokser et al. |
| 5,933,525 | A | 8/1999 | Makhoul et al. |
| 6,304,674 | B1 | 10/2001 | Cass et al. |
| 2003/0058340 | A1 | 3/2003 | Lin et al. |
| 2003/0123702 | A1 | 7/2003 | Colmenarez et al. |

FOREIGN PATENT DOCUMENTS

| | | |
|---|---|---|
| JP | 2001-356793 | 12/2001 |
| JP | 2003-131687 | 5/2003 |

OTHER PUBLICATIONS

Weber, Katrin et al.; Speech Recognition using Advanced HMM2 Features; Automatic Speech Recognition and Understanding, 2001. ASRU '01. IEEE WO Dec. 9-13, 2001 pp. 65-68.*
Blei et al., "Topic Segmentation with an Aspect Hidden Markov Model", SIGIR '01 pp. 343-348, 2001.
Salamatian et al., "Hidden Markov Modeling for Network Communication Channels", ACM Sigmetrics, pp. 92-101, 2001.
Fu J. Huang et al., "Consideration of Lombard Effect For Speechreading", IEEE, pp. 613-618, 2001.

(Continued)

*Primary Examiner*—Abul K. Azad
(74) *Attorney, Agent, or Firm*—Gibb & Rahman, LLC (57) ABSTRACT

A system, method and program storage device implementing a method for modeling a data generating process, wherein the modeling comprises observing a data sequence comprising irregularly sampled data, obtaining an observation sequence based on the observed data sequence, assigning a time index sequence to the data sequence, obtaining a hidden state sequence of the data sequence, and decoding the data sequence based on a combination of the time index sequence and the hidden state sequence to model the data sequence. The method further comprises assigning a probability distribution over time stamp values of the observation sequence, wherein the decoding comprises using a Hidden Markov Model. The method further comprises using an expectation maximization methodology to learn the Hidden Markov Model.

6 Claims, 6 Drawing Sheets

OTHER PUBLICATIONS

Matsuda et al., "Asynchronous-Transition HMM", IEEE, pp. 1005-1008, 2000.

IBM Technical Disclosure Bulletin, "Iterative Scheme for the Maximum Mutual Information Training of Hidden Markov Models", vol. 33, No. 7, pp. 308-310, 1990.

Leung et al., "Speech Recognition Using Multi-State Acoustic and Articulatory Features Models With Asynchronous States Transistion", IEEE, p. IV-4163, 2002.

Wright et al., "Neural Network Modelling with Input Uncertainty: Theory and Application", INSPEC, Abstract Only, 2001.

Wright, "Bayesian Approach to Neural-Network Modeling with Input "INSPEC, Abstract Only, 2000.

Gharamani et al., "Factorial Hidden Markov Models", INSPEC, Abstract Only, 1998.

* cited by examiner

ASYNCHRONOUS HIDDEN MARKOV MODEL METHOD AND SYSTEM

BACKGROUND OF THE INVENTION

1. Field of the Invention

The invention generally relates to time series data modeling, and more particularly to Hidden Markov Models (HMMs) utilized to model both dependent and independent variables in multiple applications.

2. Description of the Related Art

Within this application several publications are referenced by Arabic numerals within brackets. Full citations for these and other publications may be found at the end of the specification immediately preceding the claims. The disclosures of all these publications in their entireties are hereby expressly incorporated by reference into the present application for the purposes of indicating the background of the invention and illustrating the general state of the art.

The term "asynchronous" is used herein to mean multiple events of interest that occur at different, but distinct, times. Hidden Markov Models [1] are a popular tool to model time series data and are widely used in fields such as speech recognition and bioinformatics. While modeling the data using HMMs, it is assumed that there is an underlying Markov process that generates the hidden state sequence, wherein observations are made at regular intervals conditioned on these states. However, for a number of reasons the latter assumption may not always hold. For example, when speech data is transmitted over a noisy channel before recognition, then some of the frames of data might be lost. Additionally, in speech systems it is well known that occasionally there are less speech frames for a particular phoneme than needed to fully traverse all the states [2]. Conventional approaches to solve these problems can be broadly divided into two categories:

First, if the actual time stamps of the missing frames are available, then interpolated values can be used to fill the missing observations. Once predicted, data is decoded using conventional HMMs [3]. However, one drawback of the interpolation approach is that one needs to know where the missing data is in order to properly interpolate values to fill in the missing data. Second, modifying the structure of the underlying HMM by adding a skip-arc (allows certain states to be skipped). The weights of the skip-arcs are either learned by training a modified model on data with missing frames or chosen in some ad-hoc manner. This new model is then used for decoding [2]. However, one drawback of the skip-arc approach is that it yields an over-generalization of the results.

Figure 1:
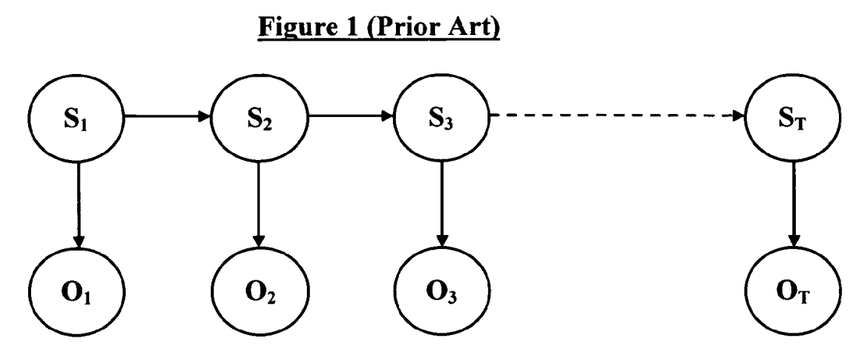
FIG. 1 is a schematic representation of a conventional HMM.

FIG. 1 illustrates a conventional HMM expanded in time. Here, $S_i \in \{1, \ldots, N\}$ and $O_i \in \{1, \ldots, M\}$ are random variables referred to as hidden states (S) and observations (O). The corresponding sequences of random variables are denoted as $S=\{S_1, \ldots, S_T\}$, $O=\{O_1, \ldots, O_T\}$. The conventional HMM is characterized by parameter vector $\lambda=(A, B, \pi)$, where A represents a transition probability matrix. A is a N×N matrix where $\alpha_{ij}=A(i,j)=P(S_t=i|S_{t-1}=j)$; B represents an observation probability matrix. B is a M×N matrix where $b_{ij}=B(i,j)=P(O_t=i|S_t=j)$; and $\pi$ represents an initial state probability matrix. Here, $\pi$ is a N×1 matrix where $\pi(i)=P(S_1=i)$.

As such, because conventional HMMs rely on the assumption that observations are made at regular intervals, if this assumption does not hold, then there is likely to be a mismatch between the model and the data, which may subsequently degrade system performance (whatever system is being modeled). Therefore, due to the limitations to the approaches of modeling using the conventional HMMs, there is a need for a new and improved HMM modeling technique that overcomes the deficiencies of the conventional approaches.

SUMMARY OF THE INVENTION

In view of the foregoing, an embodiment of the invention provides a system and method for modeling a data generating process, wherein the modeling comprises observing a data sequence comprising irregularly sampled data, obtaining an observation sequence based on the observed data sequence, assigning a time index sequence to the data sequence, obtaining a hidden state sequence of the data sequence, and decoding the data sequence based on a combination of the time index sequence and the hidden state sequence to model the data sequence. The method further comprises assigning a probability distribution over time stamp values of the observation sequence, wherein the decoding comprises using a Hidden Markov Model. The method further comprises using an expectation maximization methodology to learn the Hidden Markov Model, wherein the expectation maximization methodology comprises computing a posterior distribution over the hidden variables conditioned on the observation sequence and estimated parameters. Furthermore, the modeling may be used in applications comprising any of speech recognition applications, jitter cancellation systems, video compression systems, business intelligence knowledge management systems, and bioinformatics applications. Additionally, the irregularly sampled data may comprise missing data.

According to another embodiment, the invention provides a system for modeling a data generating process comprising a first processing component configured for observing a data sequence comprising irregularly sampled data, a second processing component configured for obtaining an observation sequence based on the observed data sequence, a third processing component configured for assigning a time index sequence to the data sequence, a fourth processing component configured for obtaining a hidden state sequence of the data sequence, and a decoder operable for decoding the data sequence based on a combination of the time index sequence and the hidden state sequence to model the data sequence, wherein the second processing component is configured for assigning a probability distribution over time stamp values of the observation sequence.

Generally, the invention provides a novel asynchronous HMM that takes a Bayesian approach to extending HMMs to model irregularly sampled sequential data. As such, the invention expands the conventional HMMs to model both dependent (known) data and independent (new and unknown) data. In accordance with the asynchronous HMM, a novel nested EM training methodology is also provided to avoid "learning" the wrong model due to a variation in the input data sample timing. As demonstrated with experiments, the invention achieves several advantages over the conventional HMMs. Moreover, the invention generally outperforms the conventional methods by a substantial margin as well. To illustrate these advantages, the experiments were conducted on both artificial and speech data with a small percentage of randomly deleted observations. The results of the experiments on both the synthetic data and real speech data demonstrate that asynchronous HMM is very effective in handling missing observations in sequential data. According to the invention, time stamps associated with each data sample are treated as hidden variables.

In fact, using the invention, gains were discovered through experimentation on speech data without random deletions as well. This unexpected positive result may be attributed to better handling of long words where there may not be enough observations for every state in the word. Similar gains were found using a restricted asynchronous model according to the invention.

These and other aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the invention. The examples used herein are intended merely to facilitate an understanding of ways in which the invention may be practiced and to further enable those of skill in the art to practice the invention. Accordingly, the examples should not be construed as limiting the scope of the invention.

As mentioned, there is a need for a new HMM modeling technique that overcomes the deficiencies of the conventional modeling approaches. The invention addresses this need by providing an asynchronous HMM that assumes that the independent variables in a set of sampled data contain some hidden variation, which is modeled along with the dependent variables. Moreover, the invention optimizes the fit of the dependent variables and the limited hidden variation presumed to exist in the independent variables using a modified EM (expectation maximization) methodology. Referring now to the drawings, and more particularly to FIGS. 2 through 7, there are shown preferred embodiments of the invention.

Figure 2:
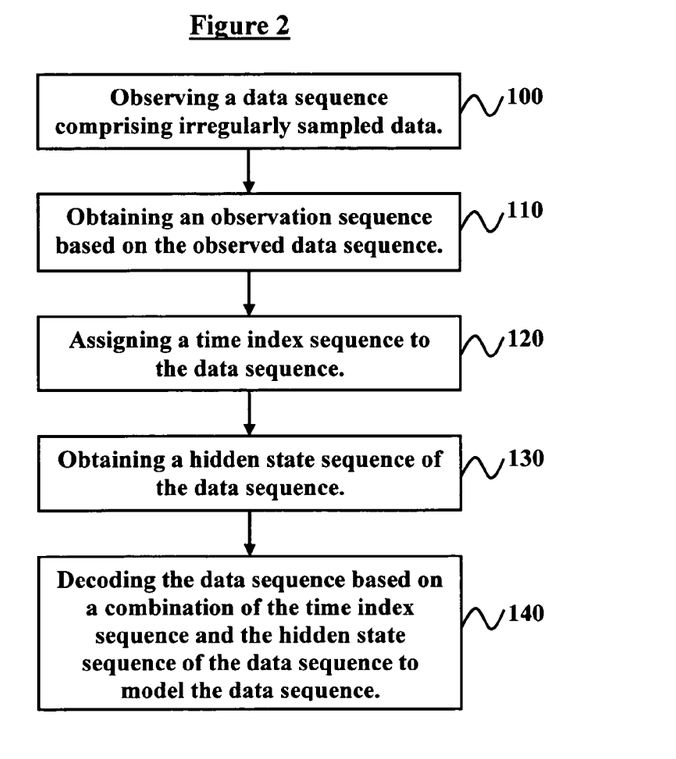
FIG. 2 is a flow diagram illustrating a preferred method of the invention.

FIG. 2 describes a method of modeling potentially irregularly-shaped data comprising independent and dependent variables, wherein the method comprises observing 100 a data sequence comprising irregularly sampled data. Next, the method includes obtaining 110 an observation sequence based on the observed data sequence and assigning 120 a time index sequence to the data sequence. Then, the invention obtains 130 a hidden state sequence of the data sequence. Thereafter, the method involves decoding 140 the data sequence based on a combination of the time index sequence and the hidden state sequence of the data sequence to model the data sequence. The method further comprises assigning a probability distribution over time stamp values of the observation sequence, wherein the decoding 140 comprises using a Hidden Markov Model. The method further comprises using an expectation maximization methodology to learn the Hidden Markov Model, wherein the expectation maximization methodology comprises computing a posterior distribution over the hidden variables conditioned on the observation sequence and the estimated parameters. Furthermore, the modeling may be used in applications comprising any of speech recognition applications, jitter cancellation systems, video compression systems, business intelligence knowledge management systems, and bioinformatics applications. Additionally, the irregularly sampled data may comprise missing data.

The invention provides an asynchronous HMM that directly models the uncertainty associated with missing observations without assuming the availability of time stamps, which are required for interpolation. This is achieved by actually modeling the time stamps associated with each observation as a hidden variable. As a consequence of this, the time interval between each pair of observations may not be the same, which results in the transition matrix becoming time dependent. According to the invention, if the time gap is k, then the effective transition matrix is $A^k$. This makes the asynchronous HMM a special case of the inhomogeneous HMM. However, unlike the more general case of inhomogeneous HMMs where the transition matrix varies with time, the invention's underlying transition matrix is fixed and the variability arises due to the irregularity in the sampling process. Additionally, in certain cases, a restricted asynchronous HMM can be implemented that differs from the conventional HMM during the training phase.

According to the invention, an observation sequence is defined as $\tilde{O}=\{\tilde{O}_1, \tilde{O}_2, \ldots, \tilde{O}_K\}$. Next, it is assumed that $\tilde{O}_k$ is observed at time $C_k$ where $C_k \leq T$, however the actual value of $C_k$'s are unknown. There are (T,K) possible ways in which the time index can be assigned to the observation sequence. However, many of these choices may not be feasible due to the constraints imposed by the observation and transition probability matrices. Moreover, it may be desirous to incorporate prior information in the form of a distribution over the length of the sequence or over the time gaps between individual observations. As such, the invention's asynchronous HMMs are designed to solve this problem of missing observations as further described below. Missing observations or irregularly sampled data may be thought of as regularly sampled data with some of the data missing.

For the observation sequence $\tilde{O}_K$, if $\forall k: C_k=k$ (i.e., there are no missing observations) then the problem reduces to that of the conventional model. According to the invention, $C_k$ may take on any values under the constraint $C_1<C_2, \ldots, C_K \leq T$. It is therefore conceivable that for some values of k, the difference between successive $C_k$'s can be greater than one. The invention is further generalized if instead of the actual values of $C_k$, only a prior distribution over the values that $C_k$ can take is assumed to be known. Furthermore, $C_{k+1}$ is not independent of $C_k$ due to the temporal constraint $C_{k+1}>C_k$.

Figure 3:
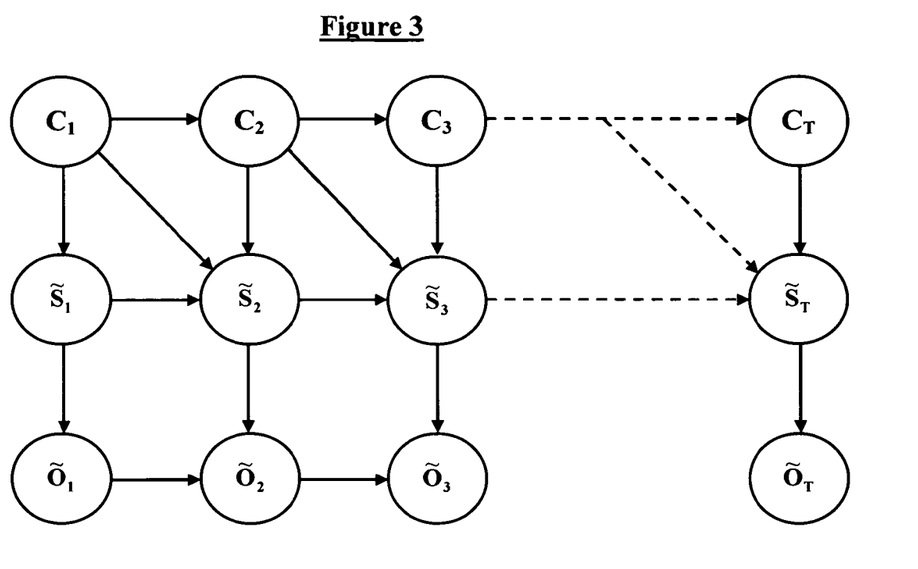
FIG. 3 is a schematic representation of an asynchronous HMM according to an embodiment of the invention.

FIG. 3 represents an asynchronous HMM according to an embodiment of the invention. Given that $S_k$, $\tilde{O}_k$ are observed at time $C_k$, the variables $S_{C_k}$ and $O_{C_k}$ will be used interchangeably with $S_k$ and $\tilde{O}_k$. The additional parameters used to characterize the asynchronous HMM according to the invention are:

P($C_{k+1}|C_k$), which is the probability distribution over the values taken by $C_{k+1}$ conditioned on the values of $C_k$. This is the prior model for the sequence $C_1 \ldots C_k$. For simplicity, a first order Markov assumption is made about $C_{k+1}$. In addition, P($C_{k+1}|C_k$) can also be used to impose the constraint that $C_{k+1} > C_k$ while at the same time $C_k \leq T_{max}$, which is the maximum length of the ground truth observation sequence.

P($\tilde{S}_{k+1}=j|\tilde{S}_k=i, C_{k+1}, C_k$), wherein since $C_k$ is the time stamp associated with $S_k$ this yields Equation (1):

$$P(\tilde{S}_{k+1}=j|\tilde{S}_k=i, C_{k+1}, C_k) = [A^{(C_{k+1}-C_k)}]_{ij} \qquad (1)$$

Here, A represents the transition probability matrix of the asynchronous HMM, and the $ij^{th}$ element of $A^{(C_{k+1}-C_k)}$ is obtained by summing the probabilities of all state sequences of length $C_{k+1}-C_k$ that begin at state i and end at state j. It is this particular choice of parameter that distinguishes the invention's asynchronous HMM from other extensions of HMM such as factorial [4] or coupled [5] HMM.

As such, if $\lambda$ represents the parameters according to the invention's model, then the joint probability of the observation sequence, state sequence, and time index sequence of length K, can be written as:

$$P(\tilde{O}, \tilde{S}, C|\tilde{\lambda}) =$$

$$P(\tilde{O}_1|\tilde{S}_1)\prod_{k=2}^{K}P(\tilde{O}_k|\tilde{S}_k, C_k)P(\tilde{S}_k, C_k|\tilde{S}_{k-1}, C_{k-1}) =$$

$$P(\tilde{O}_1|\tilde{S}_1)\prod_{k=2}^{T}P(O_{Ck}|S_{Ck}, C_k)P(C_k|C_{k-1})[A^{(C_{k+1}-C_k)}]_{S_{C_{k-1}}, S_{C_k}}.$$

Here, the joint probability is broken down into the product of the probability of the observation given the state and time index at step k, and the total probability of all possible state sequences between the state and time index at step k and state and time index at step k+1. The latter is given by raising the state transition probability matrix A to the power of the time difference between step k and k+1.

Once the parameters of the asynchronous model are estimated, decoding may be accomplished using a two step process including obtaining the most likely time index sequence ($C_k$) followed by obtaining the hidden state sequence $S_k$. Estimating the parameters of this model is non-trivial and there are significant challenges involved. However, the invention uses a nested EM methodology to aid in providing a solution.

One of the differences between the invention's asynchronous HMM and the conventional HMMs lies in the explicit time label $C_k$ associated with each observation and the associated probability P($C_k|C_{k-1}$). For certain limited cases, a restricted asynchronous HMM can be derived, which can be implemented as a conventional HMM during the decoding phase. The restricted asynchronous HMM is useful in situations where simplifying assumptions can be tolerated.

A simplified example of this is the assumption that P($C_k|C_{k-1}$)=1 if $C_k=C_{k-1}+1$, and 0 otherwise. A more general case makes the following assumption:

$$P(C_k|C_{k-1})=P(n) \text{ where } n=C_k-C_{k-1} \qquad (2)$$

Without the assumption given in Equation (2), the resulting HMM will have a transition matrix A that is dependent on k and hence cannot be implemented as a conventional HMM. Here, P(n) denotes the distribution over the duration between any two consecutive observations, with P(n)$\geq$0; $\forall n \geq 1$ and $$\Sigma_n P(n) = 1.$$

Further, assuming that $C_1=1$, the asynchronous model can now be written as:

$$P(\tilde{O}, \tilde{S}|\tilde{\lambda}) = P(\tilde{O}|\tilde{S}, \tilde{\lambda})\sum_{C}P(\tilde{S}|C, \tilde{\lambda})P(C|\tilde{\lambda}) \qquad (3)$$

$$= P(\tilde{O}|\tilde{S}, \tilde{\lambda})\prod_{k=1}^{K-1}\sum_{n}P(n)[A^n]_{S_{C_k}, S_{C_{k+1}}}P(S_{C_1})$$

$$= P(\tilde{O}|\tilde{S}, \tilde{\lambda})\prod_{k=1}^{K-1}\hat{A}_{S_{C_k}, S_{C_{k+1}}}P(S_{C_1})$$

where, $$\hat{A} = \sum_{n=1}^{\infty}P(n)A^n$$

This equation illustrates one way of treating the data in the case where the explicit time index C is unknown. This is equivalent to the conventional HMM with a transition matrix $\hat{A}$. This implies that whenever the distribution over $C_{k+1}-C_k$ is independent of k, the restricted asynchronous HMM with parameters $\{\hat{A}, B, \pi\}$ where $\hat{A}$, as given in Equation (3), can be used instead of a full asynchronous HMM according to the invention. The restricted asynchronous HMM requires less computation than the full synchronous HMM, and depending on the application may be easier to implement due to this reduction in computation. In practice, it is similar to using a skip-arc model, which are well-known in the art, but the transition matrix ($\hat{A}$) in this case is obtained in a different manner.

This implication is of particular interest in problems such as speech recognition, where well-known strict left-to-right HMMs are used. Each state has a self loop and a single forward transition to the next state. In such models, if there are fewer observations than HMM states, skip-arcs are used to enable jumps over one or more states. The transition probabilities for these arcs can either be obtained from retraining or by using some fixed prior model. This conventional approach has been used in speech recognition, but with limited effectiveness [2]. The main drawback in adding skip-arcs and retraining is that the resulting increase in degrees of freedom to the model reduces the accuracy. According to the invention, instead of adding skip-arcs to the HMM one can use the restricted asynchronous HMM to model this data. The resulting HMM has a transition matrix given by Equation (3). During retraining, A is set to be a strict left-to-right HMM, but p(n) is allowed to take a non-zero value for n>1. As further described below, this model is effective in speech recognition even if retraining is not performed and even if a fixed prior for p(n) is used.

However, if during decoding, the actual time index of the observed sequence is desired, then a full asynchronous model is more advantageous. Similarly, if the distribution is a function of k; i.e., P($C_k=C_{k-1}+n|C_{k-1}$)=p(n,k), then a full asynchronous HMM is more advantageous.

As mentioned, the asynchronous HMM is a model provided by the invention to handle missing observations. If there are no missing observations in the training data, then the best one can do is to use a conventional HMM. However, if a missing observation is encountered during decoding, the conventional HMM is enhanced by additional parameters $P(C_k=C_{k-1})$ to form an asynchronous HMM. Unfortunately, a conventional EM methodology cannot be directly used to learn the parameters for an asynchronous HMM. However, a nested EM methodology may be used.

Using the analysis for the conventional HMM [1], the EM methodology for an asynchronous HMM would iterate through the following two steps:
E Step: Compute $P(C, S|\tilde{O}, \lambda^q)$
M Step:

$$\tilde{\lambda}^{q+1} = \arg \max_{\tilde{\lambda}} \sum_{C,\tilde{S}} P(C, \tilde{S} | \tilde{O}, \tilde{\lambda}^q) \log P(C, \tilde{S}, \tilde{O} | \tilde{\lambda})$$

In the E step above, the posterior distribution over the hidden variables of the model conditioned on the observations and the current estimate of parameters is computed. This is accomplished by extending the forward-backward methodology presented in [1] to the case when hidden state space corresponds with $(S_t, C_t)$. Compared to the EM methodology for a conventional HMM, in this case, according to the invention, the straightforward maximization in the M step above will not lead to closed form expressions for the estimated parameters. The difficulty is attributed to the term:

$$\log P(\tilde{S}_{k+1}|\tilde{S}_k, C_k, C_{k+1}, \lambda) = \log [A^{C_{k+1}-C_k}]_{\tilde{S}_k, \tilde{S}_{k+1}}$$

This is the probability of a Markov path of length $C_{k+1}-C_k$ starting in state $S_k$ and terminating in state $S_{k+1}$. It shows that this is a function of the transition matrix raised to the power of the time difference between step k and step k+1.

Because there is a summation inside the log (as a result of raising a matrix to a certain power), the derivative of this with respect to parameters $\alpha_{ij}$ will not yield closed form expressions. To circumvent this problem, additional hidden variables $S_{C_k+1}, \ldots, S_{C_{k+1}-1}$ (states corresponding to missing frames) are introduced. This can be performed because there are $C_k$s from the first E step. The M step may now be solved using another EM methodology where the following computations are first made:
E Step: Compute $\forall k; P(S_{C_k+1}, \ldots, S_{C_{k+1}-1}|S, \mathcal{C}, \tilde{O}, \lambda^q)$
M Step:

$$\tilde{\lambda}^{q+1} = \arg \max_{\tilde{\lambda}} \sum_{C,S} P(C, S | \tilde{O}, \tilde{\lambda}^q) \log P(C, S | \tilde{O}, \tilde{\lambda})$$

The update equation for parameter $\alpha_{ij}$ may now be written as:

$$a_{ij}^{q+1} * Z_j = \sum_{t=C_k}^{C_{k+1}} \sum_{k=1}^{T} \sum_{C_{k,k+1}, \tilde{S}_{k,k+1}} P(\tilde{S}_k, \tilde{S}_{k+1}, C_k, C_{k+1} | \tilde{O}, \tilde{\lambda}^q)$$

$$P(S_t = i, S_{t+1} = j | \tilde{S}_k, \tilde{S}_{k+1}, \tilde{\lambda}^q)$$

where q is the iteration number and $Z_j$ is the normalization constant. The update equation for other parameters can be obtained similarly. This second level of EM treats the time stamps C as hidden variables and computes the expected value of them given the current parameters and observations. The rest of the HMM parameters are then updated assuming the expected time stamps.

In practice, however, one can make a number approximation to simplify the computation. For example, one can pick the most likely values of $C_k$ from the first E step and treat $C_k$ as observed during the second EM methodology (the one nested inside the M step). This method can be viewed as a special case of the generalized EM methodology [6] as in each M step it may not maximize the likelihood but rather return a set of parameters with a higher likelihood. It is easy to see that with each iteration of the EM the likelihood increases.

According to a third EM methodology, a three step process is employed:
E Step 1: Estimate the hidden state time index sequence $C_1, \ldots, C_k$.
E Step 2: Based on the estimated time indexes, obtain the hidden state sequence $S_1, \ldots, S_k$.
M Step: Estimate the parameters that maximize the probability.

A manner of implementing the above EM methodology, and consequently implanting the asynchronous HMM according to the invention is to define a new state variable Q that is the product of the state spaces of S and C. If S $\in 1, \ldots, N$ and C $\in 1, \ldots, T$ then Q can be defined as:

$$Q \in 1, \ldots, NT \text{ where } Q_k = N(C_k-1) + \hat{S}_k$$

Next, a new transition matrix can be obtained for Q from:

$$P(Q_k | Q_{k-1}) = P(\tilde{S}_k = j, C_k | \tilde{S}_{k-1} = j, C_{k-1}) \quad (4)$$
$$= P(\tilde{S}_k = j | \tilde{S}_{k-1} = i, C_k, C_{k-1}) P(C_k | C_{k-1})$$
$$= [A^{C_k - C_{k-1}}]_{ij} P(C_k | C_{k-1})$$

Hence, using Equation (4) the invention's asynchronous HMM can be implemented as a conventional (normal) HMM with an extended state space and a transition matrix computed from Equation (4). However, for a small number T this leads to a significant increase in the number of states. As such, the invention provides two approaches of handling this issue: (1) dynamically expand the state space; and (2) simplify the asynchronous HMM by redefining C to reduce its range.

With regard to the first approach involving dynamic state space expansion, instead of statically expanding the product of the state spaces of S and C to Q, the invention uses a dynamic expansion that only creates the states that are going to have a high probability associated with them. Dynamic HMM implementations are well-known in large vocabulary speech recognition systems [8]. For the particular case of the asynchronous HMM, a breath first search can be implemented that searches the HMM using a time synchronous beam search. The beam can be set to limit the underlying set of values for $C_k$ that are kept alive for each state $S_k$.

With regard to the second approach involving redefining C to reduce its range, this can be achieved in a way that preserves the underlying ability to model irregularly sampled and incomplete data. One approach of doing this is to define $C_k-1$ to be the difference between the time k the observation is made and the real time t the observation was generated. Hence, $C_k-1=t-k$ and $\tilde{O}_k=O_t$ where $t=k+C_k-1$. Also, $$P(S_k = j | S_{k-1} = i, C_k, C_{k-1}) = [A^{C_k-C_{k-1}+1}]_{ij}$$

This equation indicates that the probability of going from state i with delay $C_{k-1}$ to state j with delay $C_k$ is given by the element i,j or the transition matrix raised to the power of the difference in delays. Next, a restriction can be imposed that the maximum delay should be less than D; i.e., that $C \in 1, \ldots, D$. Since D can be much smaller then the maximum value of t, the total number Q space states becomes much more manageable.

As an example, if D is set equaled to 2 and Q is defined as in Equation (4), then it can be seen that the effective transition matrix in Q space, $A_Q$ is given by:

$$A_Q = \begin{bmatrix} A_S[A_C]_{11} & A_S^2[A_C]_{12} & A_S^3[A_C]_{13} \\ Z & A_S[A_C]_{22} & A_S^2[A_C]_{23} \\ Z & Z & A_S[A_C]_{33} \end{bmatrix} \quad (5)$$

where $A_S$ is the transition matrix in S space, Z is a matrix of zeros and $[A_C]_{ij}=P(C_k=j|C_{k-1}=i)$.

A further simplification can be made if it is assumed that there is only a single contiguous block of missing observations. In this case:

$$A_C = \begin{bmatrix} a_0 & a_1 & a_2 \\ 0 & 1 & 0 \\ 0 & 0 & 1 \end{bmatrix}$$

This transition matrix for C ensures that once a transition from C=1 has been made, then no further transitions in the value of C are possible except self transitions; i.e., a single block of 1 ... D missing frames can be modeled. For this particular case C can be further redefined as follows:

$$C = \begin{cases} 1 & \text{if there are no missing frames} \\ 2 & \text{if a block of } \leq D \text{ frames is missing} \end{cases}$$

The effective matrix in Q space now becomes $$A_Q = \begin{bmatrix} A_S a_1 & \sum_{d=2}^{D} A_S^d a_d \\ Z & A_S \end{bmatrix} \quad (6)$$

To evaluate the asynchronous HMM, two sets of experiments were performed. The first experiment was performed on synthetic data, while the second set of experiments was conducted on real speech data. In both sets of experiments, the training data was assumed to be complete and missing observations were considered only in the testing phase. Consequently, retraining was not performed.

For each experiment the following models were compared:
(a) A conventional HMM using 3-state left-to-right allophone models;
(b) A restricted asynchronous HMM which can be implemented as a conventional HMM where the normal transition matrix A has been changed to:

$$\hat{A} = \sum_m \sigma_m A^m \text{ and } \sum_m \sigma_m = 1. \quad (7)$$

By carefully adding skip-arcs with appropriately chosen weights, a conventional HMM can be made to have exactly the same transition matrix as the restricted asynchronous HMM. A difference between a conventional HMM and the restricted asynchronous HMM is during training only the $\sigma_m$ has to be estimated from the training data, versus weights for all the skip-arcs in the conventional case.
(c) An asynchronous HMM where:

$$P(C_k | C_{k-1}) = \begin{cases} \lambda_{k-1} \sigma_{C_k-C_{k-1}+1} & C_k \leq k+D \\ 0 & \text{otherwise} \end{cases}$$

where $\lambda$ is chosen so that $$\sum_j P(C_k = j | C_{k-1}) = 1.$$

Intuitively, it is desirous to model a prior belief that up to D frames may be considered as missing, where $\lambda \sigma_m$ gives the probability that m−1 frames are missing at a particular t. While the full asynchronous HMM allows the ability to restrict the total number of frames that are missing, in (c) there is no way to impose this restriction.

For this set of experiments, a discrete left-to-right HMM was used. The parameters of the HMM (transition and observation probability matrix) were chosen randomly. Observation sequences and corresponding hidden state sequences or length T were generated using this HMM. To simulate missing observations the sequences were sub-sampled by deleting d % of the observations. The sub-sampling process was uniform; i.e., each observation had equal probability of being deleted. A goal of the experiment was to decode the state sequence using this observation sequence.

In addition to the three cases mentioned above, for synthetic data, a skip-arc model was also considered. The conventional HMM was modified by adding skip-arcs to allow for missing observations achieved by enabling illegal paths in the original model with a small probability. This amounts to smoothing entries with zero value (of upper triangular matrix) followed by normalization.

Figure 4:
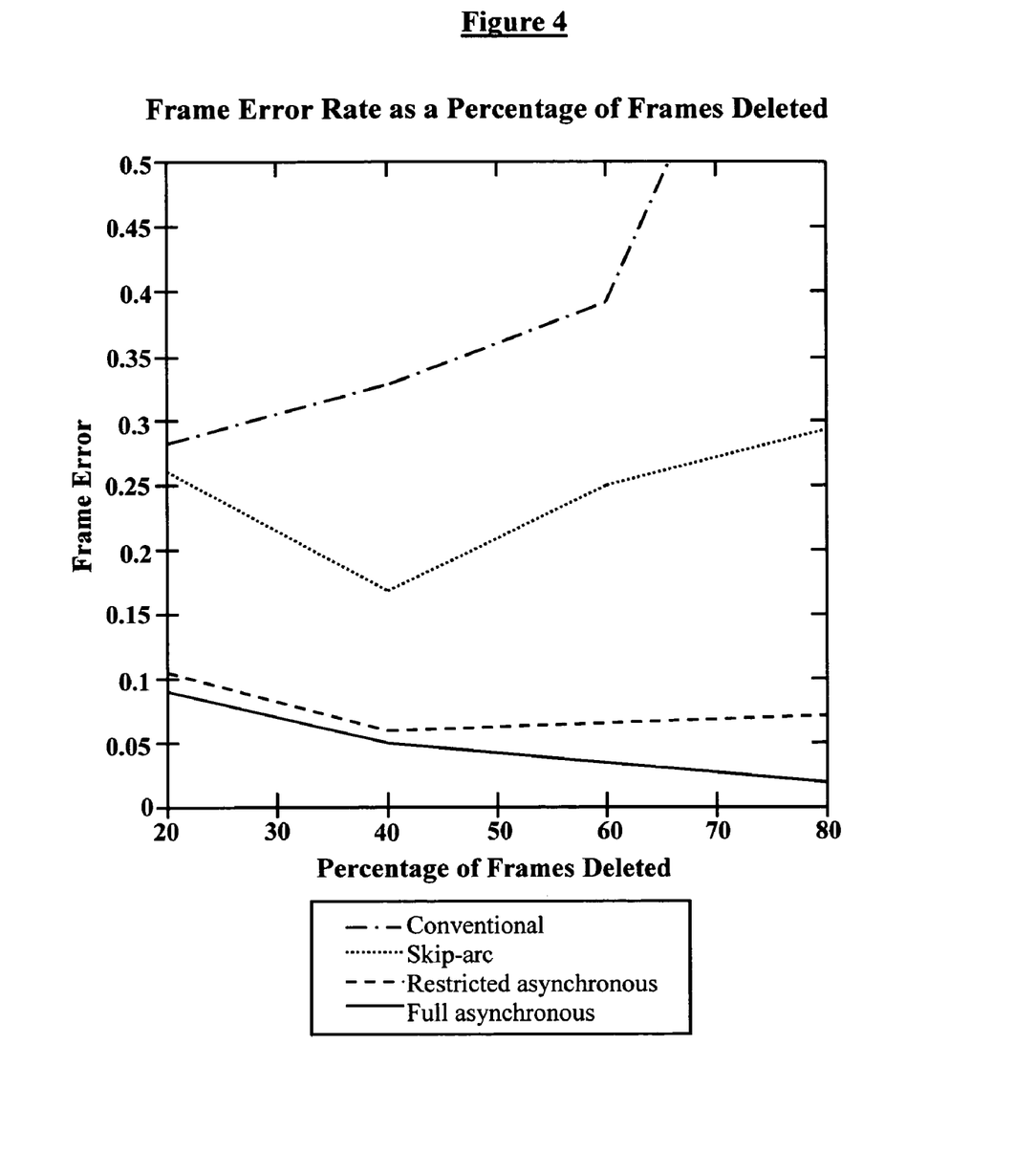
FIG. 4 is a graphical illustration of the frame error rate as a percentage of frames deleted.

The methodologies were evaluated on their ability to uncover the true hidden state sequence. FIG. 4 illustrates the results for the synthetic data. As illustrated, models (b), (c), and (d) significantly outperform (a). Further, both versions of the asynchronous HMM perform much better than the skip-arc model. The two versions of the asynchronous model differ only in that model (d) imposes a constraint over the number of missing observations. The importance of this constraint is evident from the fact that model (d) consistently outperforms model (c).

Next, a limited form of the asynchronous HMM was tested on a speech recognition task from a test database collected in a vehicle [7]. Word error rates are reported on a test set comprised of small vocabulary grammar-based tasks (addresses, digits, command, and control). Data for each task was collected at three speeds: idling, 30 mph and 60 mph. Moreover, there are 147 combinations of speaker, task, and environment in the test set, and for each combination there are 100 test utterances, giving a total of 73,743 test words. Next, error rates are computed by rescoring lexeme lattices generated using a conventional HMM-based recognizer with 561 allophones, each of which is a 3-state HMM. Additionally, the system has 10,251 continuous density Gaussians and uses 39 dimensional cepstra with delta and delta features and with acceleration at 68 frames per second. The lattices are generated from the baseline conventional HMM and had a 1-best word error rate of 2.36%. The oracle error rate for these lattices was 0.30%.

The implementation of the lattice rescoring consisted of two parts. First, by building a lexeme HMM for each lexeme arc by concatenating the constituent allophone HMMs, and second, by re-computing using the full forward-backward methodology, the log probability of the sequences of speech frames that aligned to the lexeme arc in the original decode. In this aspect, a lexeme is a word having multiple pronunciations, with a lexeme arc providing the labeling for a lexeme. That is, the lexeme arc is a unique identifier for the phoneme sequence.

The asynchronous HMM was evaluated in the following two scenarios. In the first scenario, when a user speaks quickly there may be less than three frames for some of the phonemes in a word. Most conventional HMM-based recognizers use 3-state left-to-right HMMs, which require a minimum of 3 frames, hence for fast speakers the conventional models tend to score very badly. Some conventional systems add a skip-arc between the state 1 and state 3 to allow the model to align with only 2 frames. However, in many cases this results in worse error rates [2]. Conversely, the invention's asynchronous HMM provides an alternate manner of handling this situation. Instead of adding skip-arcs, the invention assumes that there should be 3 frames but that some of them are missing.

In the second scenario, the speech frames have been transmitted via an error prone channel, and some of them are missing (e.g., a cellular channel that can detect packet errors, but does not have the bandwidth for re-transmission). The invention simulates this by randomly removing a certain percentage of the frames in each utterance.

Each of the three models (a), (b), and (c) described above were implemented by modifying the transition matrix A for the lexeme HMMs used to rescore the arcs in lexeme lattices. For (a) the original A was used, and for (b), Â given by Equation (7) was used. For (c), an additional modification was made of first extending the state space from $S=1 \ldots N$ to $S=\{1 \ldots 6N\}$, where N is the number of states in the lexeme HMM. In the new state space, $\{1 \ldots N\}$ correspond to states for which $C_t=t$, $\{N+1 \ldots 2N\}$ represent states for which $C_t=t+1$, and so on. In the extended state space, the asynchronous HMM was implemented simply by changing A to a 6N×6N matrix Â with $$\hat{A}_{R_k R_l} = P(C_t = t+l-1 | C_{t-1} = t+k-1) A$$

where $R_k=\{(k-1)N+1 \ldots kN\}$ and $R_l=\{(l-1)N+1 \ldots lN\}$. Additionally, the following parameters are set as follows: $\sigma_1=0.6$, $\sigma_2=0.25$, $\sigma_3=0.1$, $\sigma_4=0.05$, and $D=4$.

For these experiments only results for the non digit test sets in the vehicle database are reported, resulting in a database of 43,500 test words and 10,100 sentences. This is because the experiments effectively use whole word models for digits, and hence the phenomena being modeled; i.e., phonemes with less than 3 observations, does not really exist. The new baseline on the non-digit tasks is a 2.27% word error rate.

An additional factor that affects the results is that for short words where a few phonemes are matched to a long sequence of frames, it is highly unlikely that there are less than 3 frames for each phoneme. In other words, an inappropriate prior model is being imposed. Therefore, (b) and (c) are modified by using a conventional HMM transition matrix for all lexemes of less than n phonemes in length, where n is varied between 1 ... 5. The results for (a), (b), and (c) are shown in Table 1, which illustrates a comparison of word error rates (%) for a conventional, restricted asynchronous, and asynchronous HMM. The results for applying each model only to words with a certain minimum number of phonemes are shown. In each case, the error rate is over the entire non-digit test set, including words with less than the specified minimum length.

TABLE 1

Results of Word Error Rate Comparisons

| | Minimum number of phonemes per word | | | | | |
|---|---|---|---|---|---|---|
| | 1 | 2 | 3 | 4 | 5 | 6 |
| Conventional HMM | 2.27 | — | — | — | — | — |
| Restricted asynchronous HMM | 2.35 | 2.35 | 2.30 | 2.12 | 2.07 | 2.15 |
| Full Asynchronous HMM | 2.22 | 2.22 | 2.16 | 2.06 | 2.01 | 2.13 |

It can be seen that both the simplified and full asynchronous HMM achieve gains over baseline when the minimum word length constraint is imposed. The optimal gains in the error rate for (c) are achieved when missing frames are considered, but are restricted to lexemes of greater than four phonemes in length. The gain versus the baseline is approximately 10%. The invention's asynchronous HMM model consistently outperforms all of the other models. Moreover, the invention's simplified model is very close to the full model and provides good approximations if computing resources are restricted. Because these experiments do not involve retraining, the restricted asynchronous HMM in these experiments is essentially equivalent to a skip arc model where weights are computed in a systematic manner based on Equation (7).

Another manner of testing the effectiveness of the asynchronous HMM is to alter the speech frames so that some of them are actually missing. This is achieved by deleting a fixed percentage of the speech frames in each utterance. This is a situation that may arise in real systems that transmit speech vectors over a noisy channel. In addition to comparing the conventional, simplified, and full asynchronous HMM, another model (d) is evaluated, which is termed the asynchronous+ HMM. This is identical to the asynchronous HMM, except the maximum number of frames treated as missing is limited to be exactly the number missing for each lexeme arc. This is available because it is known which frames have been deleted. Therefore, the only difference between the asynchronous+ and asynchronous HMM is that in the asynchronous case, it is assumed that a maximum of five frames are missing regardless of whether far fewer where actually missing. This includes the results from digit recognition. Deleting frames from the observation stream creates a mismatch between training and testing and applies equally to the normal allophone HMMs and digit specific word level HMMs.

Figure 5:
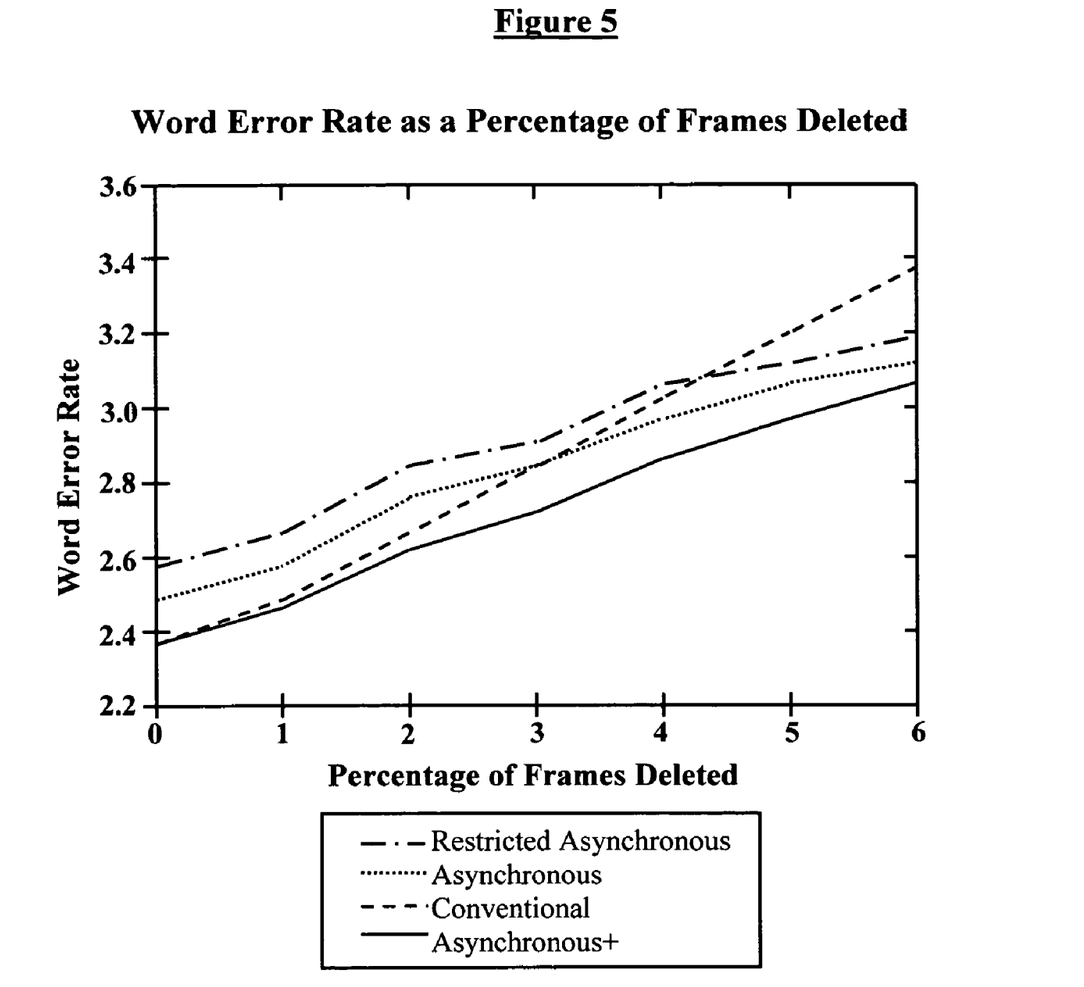
FIG. 5 is a graphical illustration of the word error rate as a percentage of frames deleted.

FIG. 5 illustrates a comparison of the word error rates for the conventional, restricted asynchronous, asynchronous, and asynchronous+ HMMs. As the percentage of deleted frames increases it can be seen that the asynchronous HMM outperforms both the conventional and skip-arc HMM. Furthermore, incorporating prior knowledge as in the asynchronous+ model, the results can be further improved.

According to this second manner of testing, in order to simulate conditions for which the data is irregularly or incompletely sampled, a single block of frames of random length is randomly removed from each utterance. The maximum length of the block is varied between 20 and 40 frames. Results are then computed for two scenarios.

In the first scenario, the location of the missing block is unknown. Here, the following systems are compared: (a) a conventional HMM; and (b) the invention's full asynchronous HMM with no prior knowledge of the location or size of the missing block, wherein the transition matrix defined by Equation (6) is used for all frames (with D=15 and $\alpha_d=0.8^d$).

In the second scenario, the location of the missing block is known. Here, the following conventional techniques that require knowledge of the location of the missing block are compared: (a) an interpolation of the data followed by a conventional HMM, wherein the interpolation is performed by linearly interpolating the state observation probabilities of the first frame before and after the deleted block; and (b) a restricted asynchronous HMM used only for frames straddling the missing block of data, wherein the transition matrix and definition of C from Equation (6) is used for the transition between the frames straddling a deleted block of data. For all other frames the $$\sum_{d=2}^{D} A_S^d a_d$$

portion of Equation (6) is replaced by a matrix of zeros.

As illustrated in Table 2, without knowledge of the location of the deleted block, the invention's asynchronous HMM achieves significant reduction in error rate versus the standard conventional HMM, especially as the size of the block increases.

TABLE 2

Results of Word Error Rate Comparisons

| Location of Block | | Maximum Size of Deleted Block | | | |
|---|---|---|---|---|---|
| | | 0 | 20 | 30 | 40 |
| Unknown | Conventional HMM | 2.36 | 6.5 | 9.41 | 12.47 |
| Unknown | Full Asynchronous HMM | 4.64 | 5.80 | 7.24 | 9.22 |
| Known | Conventional Interpolated Data | 2.36 | 4.06 | 6.35 | 8.92 |
| Known | Conventional Restricted Asynchronous HMM | 2.36 | 4.14 | 5.56 | 7.44 |

Figure 6:
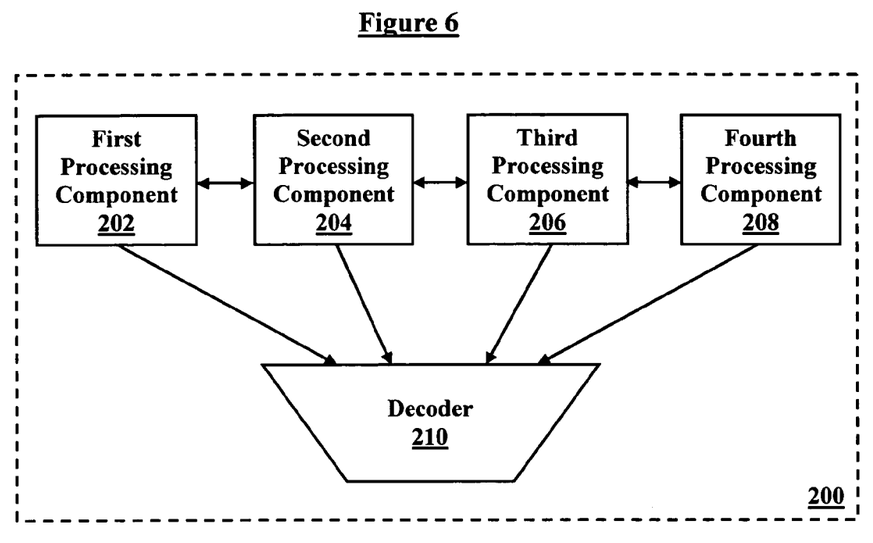
FIG. 6 is a systems diagram according to an embodiment of the invention.

A system for modeling a data generating process is illustrated in FIG. 6, wherein the system 200 comprises a first processing component 202 configured for observing a data sequence comprising irregularly sampled data, a second processing 204 component configured for obtaining an observation sequence based on the observed data sequence, a third processing component 206 configured for assigning a time index sequence to the data sequence, a fourth processing component 208 configured for obtaining a hidden state sequence of the data sequence, and a decoder 210 operable for decoding the data sequence based on a combination of the time index sequence and the hidden state sequence to model the data sequence, wherein the second processing component 204 is configured for assigning a probability distribution over time stamp values of the observation sequence.

Figure 7:
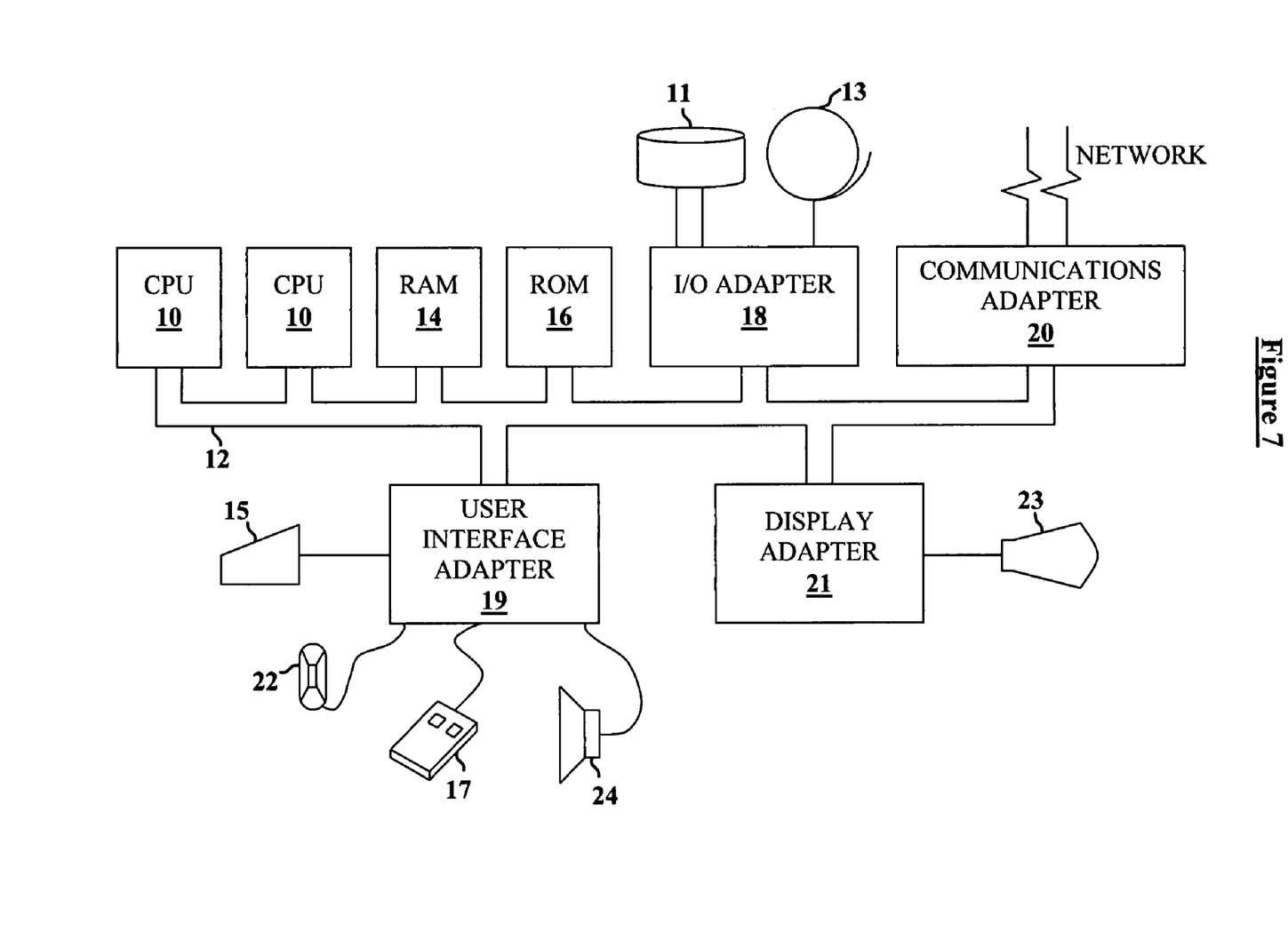
FIG. 7 is a computer systems diagram according to an embodiment of the invention.

A representative hardware environment for practicing the invention is depicted in FIG. 7, which illustrates a typical hardware configuration of an information handling/computer system in accordance with the invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 24, microphone 22, and/or other user interface devices such as a touch screen device (not shown) to bus 12, communication adapter 20 for connecting the information handling system to a data processing network, and display adapter 21 for connecting bus 12 to display device 23. A program storage device readable by the disk or tape units is used to load the instructions, which operate the invention, which is loaded onto the computer system.

As demonstrated with experiments, the invention achieves several advantages over the conventional HMMs. Moreover, the invention generally outperforms the conventional methods by a substantial margin as well. To illustrate these advantages, the experiments were conducted on both artificial and speech data with a small percentage of randomly deleted observations. The results of the experiments on both the synthetic data and real speech data demonstrate that asynchronous HMM is very effective in handling missing observations in sequential data. According to the invention, time stamps associated with each data sample are treated as hidden variables. In fact, using the invention, gains were discovered through experimentation on speech data without random deletions as well. This unexpected positive result may be attributed to better handling of long words where there may not be enough observations for every state in the word HMM. Similar gains were found using a restricted asynchronous model that can be implemented as a conventional HMM during speech recognition, for example.

Generally, the invention provides a novel asynchronous HMM that takes a Bayesian approach to extending HMMs to model irregularly sampled sequential data. As such, the invention expands the conventional HMMs to model both dependent (known) data and independent (new and unknown) data. In accordance with the asynchronous HMM, a novel nested EM training methodology is also provided to avoid "learning" the wrong model due to a variation in the input data sample timing.

In addition to speech recognition applications, the invention is applicable to several other applications including jitter cancellation systems (wherein test and measurement equipment accurately measures some dependent variable, but the time of the measurement, which is supposed to be an independent variable, actually has some variation); video compression (such as DVD and other compressed video systems, wherein reference frames occur periodically, but intervening frames are interpolated, which can produce interrupting visual glitches if not properly modeled); BIKM (business intelligence knowledge management; e.g., determining the probable true time at which product reviews, marketing data, or analysts' reports were actually created; or where OLAP (on-line analytical processing) processes may have deleted data); and bioinformatics/life sciences (e.g., gene sequences could have a missing sequence but be modeled anyway).

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

REFERENCES

[1] Rabiner, L. R., "A tutorial on Hidden Markov Models and selected applications in speech recognition," Proceedings of the IEEE, vol. 77, no. 2, pp. 257-285, 1989.

[2] Monkowski, M. D. et al., "Context dependent phonetic duration models for decoding conversational speech," Proceedings of international Conference on Acoustics, Speech and Signal processing, pp. 528-531, 1995.

[3] Grassi, S. et al., "Distributed speaker recognition using the etsi aurora conventional," Proceedings of $3^{rd}$ COST 276 Workshop on Information and Knowledge Management for Integrated Media Communication, pp. 120-125, 2002.

[4] Ghahramani, Z. et al., "Factorial Hidden Markov Models," Machine Learning, vol. 29, p. 245-273, 1997.

[5] Brand, M. et al., "Coupled Hidden Markov Models for complex action recognition," Proceedings of Computer Vision and Pattern Recognition, pp. 994-999, 1997.

[6] Neal, R. et al., "A view of the EM algorithm that justifies incremental, sparse, and other variants," Learning in Graphical Models, M. I. Jordan, Ed., Kluwer, 1998.

[7] Olsen, P. et al., "Modeling inverse covariance matrices by basis expansion," Proceedings of International Conference on Acoustics, Speech and Signal Processing, vol. 1, pp. 945-948, 2002.

[8] Ortmanns, S. et al., "A Comparison of Time Conditioned and Word Conditioned Search Techniques for Large Vocabulary Speech Recognition," Proceedings of International Conference on Spoken Language Processing, pp. 2091-2094, 1996.

What is claimed is:

1. A method of modeling a data generating process, said method comprising:

observing a data sequence comprising irregularly sampled data;

obtaining an observation sequence based on the observed data sequence;

assigning a time index sequence to said data sequence;

obtaining a hidden state sequence of said data sequence;

decoding said data sequence based on a combination of said time index sequence and said hidden state sequence to model said data sequence, wherein said decoding comprises using an asynchronous Hidden Markov Model;

assigning a probability distribution over time stamp values of said observation sequence; and using a nested expectation maximization methodology to learn said asynchronous Hidden Markov Model, wherein said nested expectation maximization methodology comprises computing a posterior distribution over said hidden variables conditioned on said observation sequence and estimated parameters.

2. The method of claim 1, wherein said modeling is used in applications comprising any of speech recognition applications, jitter cancellation systems, video compression systems, business intelligence knowledge management systems, and bioinformatics applications.

3. The method of claim 1, wherein said irregularly sampled data comprises missing data.

4. A program storage device readable by computer, tangibly embodying a program of instructions executable by said computer to perform a method of modeling a data generating process, said method comprising:

observing a data sequence comprising irregularly sampled data;

obtaining an observation sequence based on the observed data sequence;

assigning a time index sequence to said data sequence;

obtaining a hidden state sequence of said data sequence;

decoding said data sequence based on a combination of said time index sequence and said hidden state sequence to model said data sequence, wherein said decoding comprises using an asynchronous Hidden Markov Model;

assigning a probability distribution over time stamp values of said observation sequence; and using a nested expectation maximization methodology to learn said asynchronous Hidden Markov Model, wherein said nested expectation maximization methodology comprises computing a posterior distribution over said hidden variables conditioned on said observation sequence and estimated parameters.

5. The program storage device of claim 4, wherein said modeling is used in applications comprising any of speech recognition applications, jitter cancellation systems, video compression systems, business intelligence knowledge management systems, and bioinformatics applications.

6. The program storage device of claim 4, wherein said irregularly sampled data comprises missing data.

* * * * *